Patented Jan. 3, 1950

2,493,343

UNITED STATES PATENT OFFICE 2,493,343

STABILIZATION OF POLYMERIZABLE MIXTURES

Howard L. Gerhart, Milwaukee, Wis., assignor to Pittsburgh Plate Glass Company, Allegheny County, Pa., a corporation of Pennsylvania No Drawing. Application September 21, 1944, Serial No. 555,199

4 Claims. (Cl. 260—45.4)

The present invention relates to the preservation of polymerizable mixtures of resin ingredients upon premature gelling during storage and it has particular relation to the inhibition of premature gelation of polymerizable mixtures containing styrene and maleic anhydride.

One object of the invention is to provide a simple and inexpensive method of preserving polymerizable mixtures including styrene and maleic anhydride or their equivalent homologues and derivatives containing the same functioning groupings, from premature gelation before they can be cast, or otherwise employed in the formation of resin or resin-containing bodies.

A second object is to provide a method which is effective only during the storage periods and does not substantially affect ultimate polymerization of the mixture when it is exposed to the conditions normally employed to polymerize it.

These and other objects will be apparent from consideration of the following specification and the appended claims.

Heretofore, difficulty has been encountered in storing certain resin-forming mixtures, such as mixtures containing styrene and maleic anhydride, or materials containing similar groupings. The mixtures, especially if exposed to light, very quickly begin to thicken or gel, thus rendering it impossible to make up a substantial volume of stock designed to maintain operations over substantial periods of time in normal casting and coating processes. Polymerizable mixtures comprising styrene monomer, diethylene glycol and maleic anhydride are particularly bad offenders in this respect. There is, therefore, a great necessity for some method of deactivating the mixtures while they are in storage but which will not substantially affect their subsequent behavior after storage has been terminated and the materials have been disposed for final polymerization.

The present invention is based upon the discovery that premature polymerization of the above-described mixtures can be substantially obviated by maintenance of gaseous oxygen in adequate distribution thereon.

Oxygen is most readily supplied directly from the atmosphere. However, pure or concentrated gaseous oxygen is very effective. The best method of maintaining distribution of the gas in the polymerizable mixture seems to involve gradual liberation of fine bubbles into the bottom of the container in such manner that the bubbles will gradually rise through the liquid. Uniform distribution is further assisted by subjecting the mixture simultaneously to vigorous agitation. It is apparent that the oxygen can, also, be distributed by subjecting the mixture to vigorous shaking or by whipping it in the presence of oxygen. Oxygen carriers, such as activated charcoal or other porous bodies, might also be added. These, doubtless, would in many cases require filtration of the mixture before it is to be polymerized. However, in some instances these might be permitted to remain.

It is a characteristic of gaseous oxygen that it is quickly lost or becomes ineffective after aeration ceases and especially after the mixture is subjected to heating. Therefore, the mixtures of monomers or incompletely polymerized ingredients can be withdrawn from storage, at any time poured into molds, spread as sheets or films or otherwise disposed preliminary to final setting, and then subjecting to polymerization precisely as if they had not been aerated. The aeration has no appreciable effect during such setting. This is all quite surprising inasmuch as oxygen is a promoter of many polymerizations. An outstanding example of such promotion is that of the drying of paints and varnishes containing drying oils. As a matter of fact, oxidizing bodies such as peroxides, e. g., benzoyl peroxide are effective promoters of polymerization of the styrene-maleic anhydride mixtures herein disclosed. Other compositions on which free oxygen has an inhibitive effect upon gelation are:

Example A

| | Pounds |
|---|---|
| Styrene | 10 |
| Diethylene glycol ester of endomethylene tetrahydrophthalic acid | 10 |
| Benzoyl peroxide | 0.4 |

Example B

| | Pounds |
|---|---|
| Maleic anhydride | 15 |
| Styrene | 18 |
| Triethylene glycol ester of endomethylene tetrahydrophthalic acid | 15 |
| Benzoyl peroxide | .06 |

Example C

| | Pounds |
|---|---|
| Diethylene glycol maleate | 30 |
| Styrene | 5 |
| Benzoyl peroxide | 0.3 |

Examples A, B and C illustrate the usefulness of this invention in inhibiting compositions which do not contain free maleic anhydride. The method is useful for compositions consisting of mixtures of polymerizable olefins with glycol esters of maleic or fumaric acids.

For purposes of demonstrating the invention polymerizable mixtures were prepared and treated as follows:

*Example I*

| | Parts by weight |
|---|---|
| Diethylene glycol maleate | 350 |
| Styrene monomer | 180 |
| Maleic anhydride | 150 | were set away under the following conditions:

a. At room temperature in diffused light, air was slowly bubbled through the solution.

b. At room temperature in diffused light, oxygen was bubbled through the solution.

c. At room temperature in diffused light, inert gas (nitrogen and carbon dioxide) was bubbled through the solution.

d. At room temperature in sunlight, oxygen was bubbled through the solution.

e. At room temperature in diffused light, benzoyl peroxide (1%) present, air was passed through the solution.

f. At room temperature in diffused light without further treatment (control).

g. At room temperature in sunlight without further treatment (control).

Samples c, f and g gelled within 30 minutes. Samples a, b, d and e showed no signs of gelation in 40 hours at room temperature. At 160° F. or above, solid resins could be cast from the treated mixtures at the same rate as from untreated solutions.

The rate at which air is bubbled through the prepared compositions need not be rapid but it must be continuous. The best results are obtained when the solution is stirred vigorously by mechanical means and the air is introduced at the bottom of a cone-shaped container. The mere presence of air in one part of the solution does not preclude gelation in another unaerated part. Thus, it is not possible to saturate the upper portion of the container and thereby prevent gelation in the lower portion.

For the stabilization of resin forming mixtures for long periods or for stabilization in transit it is more convenient to store the liquid mixtures in oxygen or air under superatmospheric pressure. For this purpose, an oxygen pressure of 5 to 100 pounds per square inch above atmospheric is sufficient to prevent premature gelation for reasonable periods of time.

It is to be understood that the invention is applicable to various polymerizable mixtures of styrene and maleic anhydride. Styrene and maleic anhydride alone is the simplest. However, plasticizers, such as dimethyl phthalate and also nitroalkanes, certain carbonyl compounds such as diacetone alcohol, acetophenone, mesityl oxide, cyclohexanone, methyl levulinate in amounts, for example, of 10 to 30 percent based on resinifiable components can be added to the polymerizable mixture.

It will be evident that the invention is not limited to the embodiments herein disclosed, but that numerous modifications can be made therein without departure from the spirit of the invention or the scope of the appended claims.

I claim:

1. In a method of forming resinous products by conjointly polymerizing a mixture of styrene, maleic anhydride and triethylene glycol ester of endomethylene tetrahydrophthalic acid, such compounds being respectively in the ratio of 15 and 18 and 15 parts by weight, and in which the mixture is made up a substantial period before polymerization, the steps of maintaining the mixture in intimate contact with oxygen prior to polymerization by bubbling gas containing oxygen therethrough whereby to prevent premature polymerization, and then just prior to polymerization discontinuing the supply of the oxygen.

2. A process as defined in claim 1 in which the mixture is subjected to polymerization by heating it in suitable molds at the temperature of about 160° F.

3. In a method of forming a resinous product by conjointly polymerizing a mixture of styrene and an ester of endomethylene tetrahydrophthalic acid and a glycol of a class consisting of diethylene glycol and triethylene glycol and in which the mixture is made up and is maintained at room temperature a substantial period of time before polymerization, the steps of maintaining the mixture in intimate contact with oxygen prior to polymerization by bubbling gas containing oxygen therethru, whereby to prevent polymerization and then just prior to polymerization, discontinuing the supply of oxygen.

4. A process as defined in claim 3 in which the mixture is subjected to polymerization by heating it in suitable molds at the temperature of about 160° F.

HOWARD L. GERHART.

REFERENCES CITED

The following references are of record in the file of this patent:

UNITED STATES PATENTS

| Number | Name | Date |
|---|---|---|
| 2,168,808 | Schoemfeld | Aug. 8, 1939 |
| 2,345,948 | Pellett | Apr. 5, 1944 |
| 2,369,520 | Barnes | Feb. 13, 1945 |
| 2,373,464 | Dittmar | Apr. 10, 1945 |
| 2,421,876 | Gerhart | June 10, 1947 |

FOREIGN PATENTS

| Number | Country | Date |
|---|---|---|
| 549,234 | Great Britain | Nov. 12, 1942 |

OTHER REFERENCES

Kropa et al., pages 1512 and 1516, Ind. and Eng. Chem., December 1939.